Nov. 22, 1949     E. M. COPP     2,488,851
SUGAR JUICE TREATMENT

Filed May 1, 1946     3 Sheets-Sheet 1

INVENTOR.
Earle M. Copp,
BY
F. D. Prager

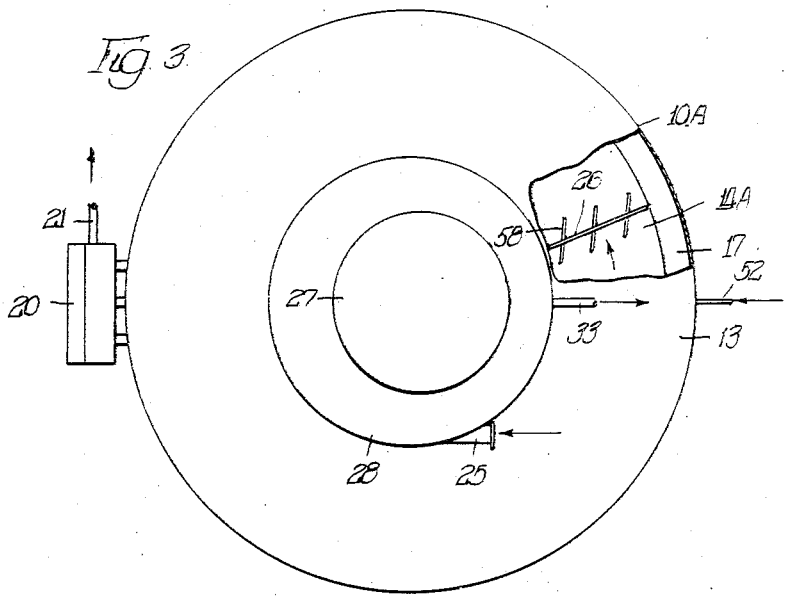
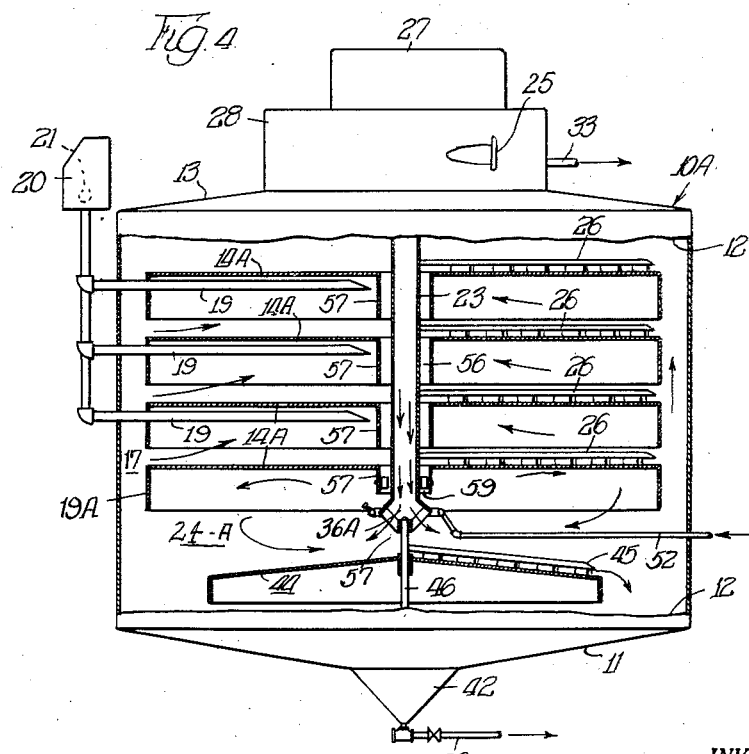

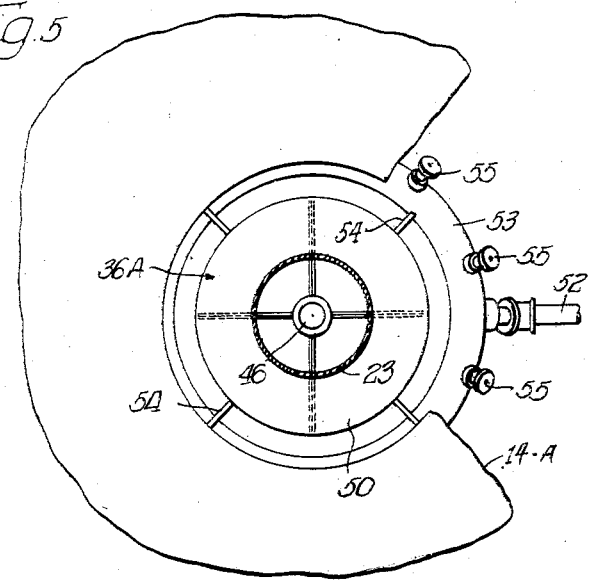
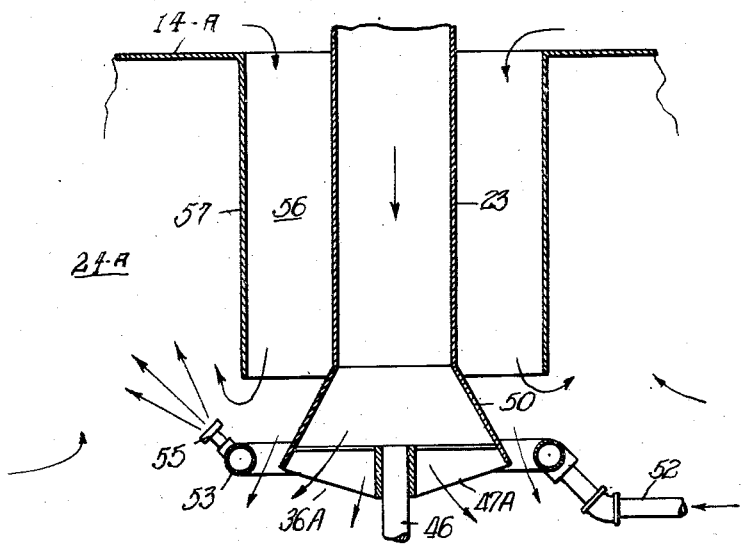

Patented Nov. 22, 1949

2,488,851

UNITED STATES PATENT OFFICE 2,488,851

SUGAR JUICE TREATMENT

Earle M. Copp, Bronxville, N. Y., assignor to Graver Tank & Mfg. Co., Inc., a corporation of Delaware Application May 1, 1946, Serial No. 666,447

11 Claims. (Cl. 210—55)

This invention relates to sugar juice treatment, particularly for the purpose of clarifying the juice.

It is a primary object of this invention to improve sugar juice clarifiers, especially as to the inlet section.

A more particular object is to design such an inlet section with greater consideration for the several distinct functions performed therein.

A still more particular object is to subdivide such an inlet section in accordance with said functions, to locate each portion of the inlet section at the position most suitable for the partial function thereof, and to design it accordingly.

Raw sugar juice is a watery substance containing dissolved sugar constituents and also carrying, as impurities, materials which tend to separate out as a floating scum, as well as other materials which tend to sink and to sediment as a mud. My invention provides a new arrangement for the scum flotation and for the flocculation required before efficient sedimentation can be obtained.

Figure 1:
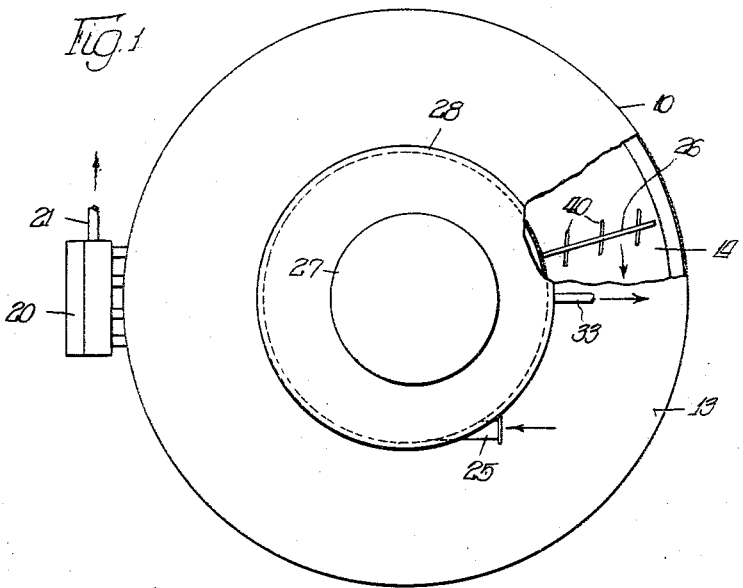
Figure 2:
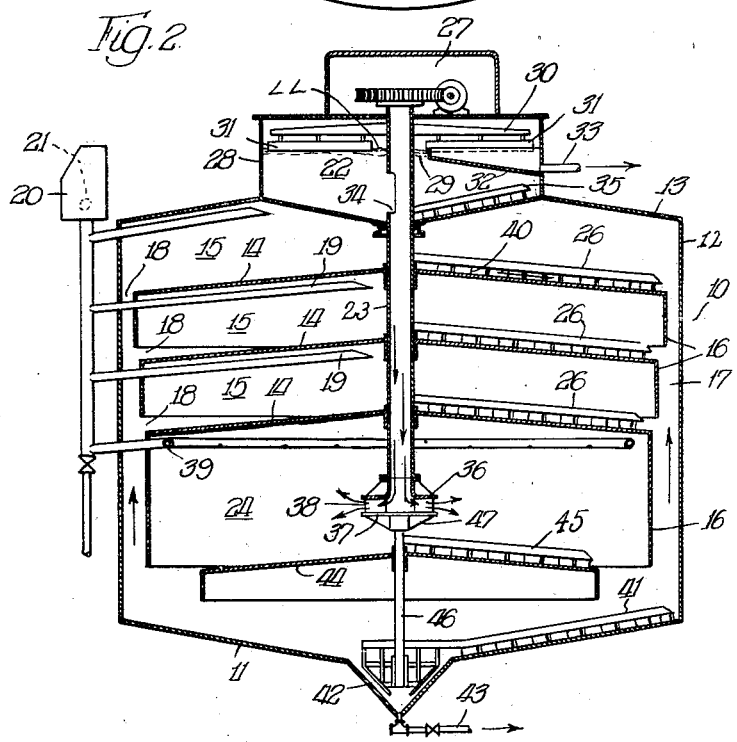

In the drawing, Fig. 1 is a plan view of an embodiment hereof with parts broken away. Fig. 2 is a central section of the apparatus of Fig. 1. Fig. 3 is a plan view of a modified embodiment, with parts broken away. Fig. 4 is an elevation, partially in central section, of the apparatus of Fig. 3. Fig. 5 is a plan view, on a larger scale, of a detail from Figs. 3 and 4. Fig. 6 is a central section of said detail.

Referring first to Figs. 1 and 2, the sugar clarifier tank 10 comprises a bottom 11, a side wall 12, and a roof 13. One or several trays 14 are rigidly installed within the tank, concentrically therewith, above one another, by conventional means (not shown), to form a plurality of superposed juice clarifying compartments 15. Each tray has a flange or apron 16 depending from the outer edge thereof to adjacent the outer edge of the next lower tray, or in the case of the lowermost apron, depending toward the bottom 11. These aprons are spaced from the side wall 12 of the tank to form a peripheral feed channel 17; and this channel communicates with each clarification compartment by means of a peripheral slot 18, defined by the respective tray and the next higher apron, or in the case of the uppermost compartment, by the tray and the side wall 12. A draw-off pipe 19 for clarified sugar juice communicates with an upper, inner part of each clarification compartment. In the present embodiment each draw-off pipe discharges by gravity, on the outside of the tank, into a clear-juice overflow box 20 equipped with a final outlet 21; said box being preferably installed adjacent the top of the tank as shown. The arrangement as so far described is well-known. Persons skilled in the art are familiar with the details and advantages of this arrangement, since numerous installations have been made, and operated for many years.

Improvements have occurred to me, relating particularly to certain inlet sections of the tank, or in other words, to the manner of feeding the sugar juice to the tank 10 and to the clarification compartments 15 and pretreating it prior to sedimentation in said compartments. These inlet sections form an integral part of the present tank, are located in specific portions thereof, as will be explained presently.

The success of clarifiers of this type is largely due to the fact that they provide ample contact between the sugar juice under treatment and the settling solids previously separated. This kind of contact takes place where the flow of juice is upward, or at least in a direction including an upward component, through a body of juice containing such settling solids. Such a flow will be called upward. Upward flows of this type take place in the clarification compartments 15, from the inlet slots 18 at the outer, lower parts, to the outlets 19 at the inner, upper parts thereof. It first occurred to me that even better success might be expected when also using an upward flow in the peripheral feed channel 17; however I discovered that this is true only under certain conditions, and not without definite precautions.

The obvious manner of providing an upward flow of juice in the peripheral feed channel 17 would involve using an inlet for raw juice at or adjacent the bottom of this peripheral channel. However, I found that the raw sugar juice as usually delivered to such a clarifier, does not allow adequate treatment when fed to the clarifier in such manner, due to the substantial amounts of materials contained in said raw juice and tending to float and to form a scum. It is imperative that the scum-forming materials be safely prevented from entering the clarification compartments 15; otherwise, at least part of them would be withdrawn together with the supposedly clarified juice.

In such clarifiers, as heretofore known, the raw juice was received at the top, skimmed and also flocculated at the top, and then fed downwards to the clarification compartments. My new idea can be expressed, in an elementary form, as follows: I combine scum removal in an upper, central part of the tank, with flocculation, in a lower part, upward flow, in the feed channel, and upward flow, in the clarification compartments. I found that this general arrangement is particularly efficient and economical where the upflow feed channel is peripherally arranged, while the passage from the scum removal section at the top to the flocculation section at the bottom of the tank is centrally disposed.

Thus I provide a central raw juice receiver and scum removal compartment 22 at the top of the tank; a flocculation compartment 24 in a lower part of the tank, reaching from the inner to the outer parts of the tank, and a central vertical downtake pipe 23 from the scum removal compartment 22 to the flocculation compartment 24. The raw sugar juice enters the receiver and scum compartment 22, desirably through inlet fitting 25 which is peripherally located and enters tangentially with respect to the compartment, between the top and bottom of the compartment. The juice then passes through the compartment 22, where scum is removed; then relatively rapidly down through the pipe 23 into the central part of the flocculation compartment 24; outwardly through this compartment; then upwardly through the feed channel 17; and finally through the clarification compartments, still in upward flows.

In order to provide this arrangement, I did away with the conventional, central scraper shaft, and provided instead, a central vertical pipe 23, which not only passes the juice from the scum removal compartment 22 to the flocculation compartment 24 but furthermore carries scraper arms 26 in each clarification compartment 15, said arms being secured to the pipe and accordingly, movable with the same. This downtake pipe and scraper carrier 23 is rotatably arranged and extends upwardly through and above the scum removal compartment 22, being rotated by a drive mechanism 27 installed above this compartment.

I prefer to make the juice receiver and scum removal compartment 22 much smaller than the tank 10, as to diameter and lateral extension, and also as to depth. Experience indicates that such a relatively small, central chamber 22 at the top of the tank provides adequate removal of scum-forming materials from typical sugar juices; at the same time simplifying the solution of the well-known, functional and structural problems of the scum removal mechanism. Accordingly, I form the scum removal compartment by installing an upstanding, annular, preferably cylindrical wall 28 on top of the roof 13, which roof, accordingly must be so constructed as to close the top of the tank in a liquid-tight manner, being exposed to a liquid pressure on the underside. The compartment 22 is installed concentrically with the roof, about half-way between the center and periphery of the tank, so that the compartment covers only about one quarter of the area of the tank, whereby the scum will be well concentrated, and easy to remove. The scum removal mechanism generally identified by the numeral 29 comprises a relatively short, horizontal skimmer arm 30, secured to the rotatable pipe 23 and outwardly extending towards the wall 28; a skimmer blade 31 coextensive with and yieldably secured to the skimmer arm; and a stationary scum trough 32 in the path of the blade 31. The top of the trough is slightly above and the bottom edge of the blade slightly below the liquid level L. L.; this level being maintained and controlled in conventional manner, for instance by proper adjustment of the overflow means 20. The scum trough is most desirably located in an upper part of the compartment 22, to allow a swirling flow of the juice, pursuant to the tangential introduction thereof at the inlet 25. The scum trough is radially arranged to still this swirling flow in the upper part of the compartment, and is secured to the inside of the wall 28, through which it discharges by means of a scum outlet passage 33. In the lower part of the compartment 22, one or several passages or openings 34 are formed in the wall of the rotatable downtake pipe 23, to allow the juice to leave the compartment 22.

It may be desirable to install an auxiliary scraper arm 35 in the bottom part of the scum removal compartment 22, and to secure it to the rotatable downtake pipe 23 adjacent the passage 34 as shown. Generally, there will be hardly any separation and deposition of mud in a small scum compartment as provided herein; however, some particularly settleable solids may tend to settle out prior to their arrival in the clarification compartments. The auxiliary scraper arm serves to sweep these solids back into the relatively rapid downflow of the juice, so that they flow through the pipe 23, and are further treated with the rest of the juice.

For such further treatment, I provide the flocculation compartment 24, in the lower part of the clarifier. In accordance with principles well understood by the art, I discharge the juice from the bottom end of the downtake pipe 23, into this compartment 24 in a flow which is somewhat rapid as compared with subsequent flow velocities especially in the clarification zones; thereby agitating the sugar juice in an eddying flow or turbulence, of course in a gentle manner, within the flocculation compartment 24. I may achieve this by means of a discharge head or nozzle 36 ejecting the juice in form of horizontal jets in the center of the flocculation compartment, in radial, outward directions. This nozzle may comprise a substantially horizontal, circular deflector member 37, installed below the bottom end of the downtake pipe, and secured thereto by vertical webs 38.

While a gentle turbulence prevails at least in parts of the flocculation compartment, clarification may simultaneously occur. Therefore, I may provide an outlet 39 for clarified juice in an upper part of this compartment. In the present embodiment, I show this outlet in a peripheral part of the compartment remote from the nozzle 36.

The juice flows upwardly through the channel 17 and then through the various clarification compartments. The solids settling in these clarification compartments 15 are scraped outwardly over the trays 14 and back into the channel, by scrapers 40 as clearly suggested in Fig. 1. Such scrapers are attached to the arms 26, suitably spaced from the central part of each tray to, or slightly beyond, the periphery thereof. Thus, while the juice flows inwards and upwards in the compartments 15, the settled solids move outwards. They are accumulated in considerable amounts on the outer parts of the trays, and finally discharged downwardly into and through the peripheral channel 17.

While this process is basically known to the art, the treatment occurring in the present channel 17 differs from prior methods, due to the upward flow of the juice in this channel. While such a channel does not have to be very wide, it still provides considerable detention time, due to its length and depth. During such detention time I provide improved contact between the solids settling in the channel and the flowing juice, which rises countercurrently thereto. Of course the channel is so dimensioned, or the flow rate so adjusted, as to allow the solids to ultimately reach the bottom 11, in view of their well-known settling characteristics. However, the sedimentation of the solids in the channel 17 is intentionally slowed up by the upward flow of the juice. A relatively high concentration of solids is thus maintained in this channel, and improved results are obtained due to such treatment.

The solids or mud accumulating on the bottom 11 are scraped to the center of the tank by a conventional scraper arm 41, for final disposal through a mud sump 42 and mud outlet 43. A conventional thickening tray 44 may be disposed above the sump 42, to protect the sump and mud outlet from the gentle agitation prevailing in the superposed flocculation compartment 24. A scraper arm 45 may sweep settled solids from the top of this tray 44. The scraper arms 41 and 45 may be carried and rotated by a vertical tail shaft 46 in line with the downtake pipe 23 and secured thereto by means of the nozzle 36, and a spider 47 attached to this nozzle.

The operation will be clear from the above, and it will be sufficient, for a complete understanding, to trace the flow and treatment of the juice as follows. Raw sugar juice enters tangentially into the receiver and skimmer 22, and spirals downwards through the middle part and then through the lower part of this receiver and skimmer, the flow velocity being slower than in the inlet pipe and being further stilled at the top so that the scum is released. Due to the relatively small size of the compartment, this released scum is well concentrated and easily removed by the mechanism 29, and the juice, in its further flow and treatment, is safely protected from pollution by scum forming materials. The further flow of the skimmed juice first leads downward rapidly passing through the rotating pipe 23, then outward with gentle agitation through the flocculation compartment 24, and then upward through the feed channel 17, countercurrently to and resulting in a dense accumulation of, a mass of settlings from the clarifying compartments 15. This results in highly efficient flocculation and the building up of large and heavy mud particles. The juice carrying such particles passes into and slowly through the clarifying compartments where rapid and complete clarification is obtained, as a result of these conditions. Large amounts of a well-clarified juice can be constantly withdrawn at 19, with a maximum of safety and economy, due to the improved pretreatment in the compartments or passages 22, 23, 24 and 17. Proportionally large amounts of well-thickened heavy mud are withdrawn at the bottom.

The clarifier 10—A of Figs. 3 to 6 is modified in several respects, although many parts, equally numbered, are similar to those described above.

The discharge head 36—A, at the bottom of the downtake pipe 23, discharges downwardly rather than laterally, and lateral deflection of the juice is obtained by impingement thereof on the thickening tray 44. In this manner, I insure complete freedom of discharge of juice from the pipe 23. The tail shaft 46 can be secured to the nozzle 36—A by means of a spider 47—A.

In order to be quite safe in providing a free discharge of juice from the downtake pipe and discharge head, I provide downwardly and successively increasing flow areas for the downward flow of sugar juice, by shaping the wall of the discharge head 36—A in form of a truncated cone or downwardly and outwardly flaring structure 50, and further, by spacing the lower edge thereof sufficiently from the tray 44 so that the area of the annular opening 51 between the nozzle and the tray is still larger than the maximum area of the discharge nozzle itself.

This arrangement, of course, prevents the formation of any appreciable jet-action, eddies or flocculating flows by the incoming juice itself. Nevertheless I may produce a very adequate type of flocculation, for the specific purposes of a sugar juice clarifier, by injecting at a suitable velocity, a small amount of low-pressure, low-temperature steam, into the juice undergoing treatment in the flocculation compartment 24—A. The exhaust steam of a conventional engine, at a pressure of about 10 pounds per square inch, and at a temperature of about 240 degrees Fahrenheit, will generally be adequate; higher temperatures must be avoided since they might result in destroying some of the sugar in the juice. When introducing such steam or eddy-forming fluid at a velocity of about 1 foot per second or at any other, suitable flocculating velocity, well known to the art, the amount of steam required is very small, and no significant dilution of the juice takes place. The steam required for present purposes is taken from the exhaust of an engine (not shown) and conducted to the clarifier by a pipe 52, which terminates in a steam distributor ring 53 surrounding the nozzle 36—A and secured thereto by brackets 54. Steam discharge nozzles 55 are distributed along this ring 53, and eject the steam into the flocculation chamber 24—A; preferably in an upward direction, adjacent the center of the chamber, so as to produce a circulating flow in this chamber which is outward at the top, downward at the periphery, and back inward over the tray 44. These outward and downward flows are confined by the superposed tray 14—A and by the flange or apron 19—A depending therefrom; these flows are most suitable for the required, uniform distribution of the juice at the base of the peripheral upflow channel 17.

Still another modification, incorporated in the present embodiment, relates to the tray design and general flow pattern. In addition to the peripheral upflow channel 17 for the sugar juice, I provide a central downflow channel 56 for mud solids separated from the juice; this central channel being arranged immediately adjacent to, and in surrounding relationship with, the rotatable downtake pipe 23 and being defined by inner flanges or aprons 57 depending from the several trays 14—A; each inner flange extending to adjacent the next lower tray, except for the lowermost, inner flange, which extends to adjacent the discharge nozzle 36—A. In this embodiment, as clearly shown in Fig. 3, the scraper blades 58 are so arranged or rotated as to move the solids inwardly over the trays, rather than outwardly and countercurrently as in Fig. 1. This results in the formation of a heavy column of mud in the inner channel 56, which tends to sink due to its specific gravity. This in turn induces a hydrostatically compensating upward flow through the peripheral channel 17. That is, the relatively light mixture of juice and solids in the peripheral channel 17 is displaced by the heavier mixture in the inner channel 56; this latter, heavier mixture being constantly resupplied due to the sedimentation of solids in the clarification compartments, and the inward displacement thereof by the scrapers.

The gravitational downflow in the inner channel, and the compensating upflow in the peripheral channel tend to result in a complete, closed, multiple cycle, with a generally outward flow through the flocculating compartment, (superimposed over the circulation described), and a plurality of inward return flows, one through each clarification compartment. Such a cycle improves the results of the treatment accorded to the sugar juice, at least in certain cases, in manner somewhat similar to the countercurrent upflow of the other embodiment. Flocs previously formed are kept in contact with the juice for a considerable time, at least some such flocs being swept from the inner channel through the flocculation compartment, and upwardly into the outer channel. In fact, additional contact is here secured, in the lower part of each clarification compartment.

In some instances I may wish to control, that is, to either accelerate or decelerate the inward flows through the clarification compartments, or the cycling flows in general. In order to decelerate such flows I may provide angularly adjustable vanes 59 at a suitable place, such as the bottom part of the inner channel 56. If the velocity of the closed circulation is excessive, it is easily reduced by slightly tilting these vanes out of a vertical position. The discharge of mud at the bottom of the inner channel is not seriously affected, since the material flowing past these vanes is in a substantially fluid condition.

The trays 14, in the first embodiment, are substantially flat, but slightly inclined towards the outside, in order to facilitate the upflow of the clarified juice to the highest point under each tray, as well as the outward displacement of the solids over each tray. In the second embodiment the trays 14—A are desirably arranged in a truly horizontal plane. Sometimes these trays 14—A may have a slight inclination towards the inside. While the discharge pipes 19 for clarified juice again are shown as communicating with the central part of each clarification compartment, it will be understood that this feature is less important herein, since the juice no longer flows exclusively from the peripheral inlet slot 18 to the center, but rather separates from the inwardly circulating flow which passes over the underlying tray; such separation taking place throughout the area of the clarification chamber.

Still other modifications will occur to persons skilled in the art.

I claim:

1. A sugar clarifier comprising a tank; a plurality of superposed settling trays in said tank, spaced from one another to form a clarification compartment above each of said trays and a flocculation compartment below the lowermost one of said trays; an outlet for clarified juice in an upper portion of each of said clarification compartments; annular wall means concentric with and secured to the top of said tank to form a scum removal compartment; a raw juice inlet in said scum removal compartment; a rotatable tube vertically extending through the centers of said trays, communicating with a lower, central portion of said scum removal compartment, and discharging into said flocculating compartment; a scum outlet in said scum removal compartment; scraper means secured to and rotatable with said tube, in a lower portion of each of said clarification compartments, to collect mud from said trays; means to rotate said tube; and means to remove collected mud from said tank.

2. A sugar juice clarifier according to claim 1 wherein said raw juice inlet comprises a fitting which enters said scum removal compartment peripherally and tangentially with respect to said annular wall means and scum removal compartment.

3. A sugar juice clarifier according to claim 1 comprising a scum trough in said scum removal compartment, and a scum blade secured to and rotatable with said tube and adapted to cooperate with said trough to move scum into said trough; said scum outlet being located in said trough.

4. A sugar juice clarifier according to claim 1 comprising scraper means secured to and rotatable with said tube in a lower part of said scum removal compartment.

5. A sugar juice clarifier according to claim 1 comprising a discharge nozzle forming part of said tube in said flocculation compartment, and being adapted to discharge the juice outwardly.

6. A sugar juice clarifier according to claim 1 comprising a juice discharge nozzle forming part of said tube in said flocculation compartment; and means to discharge a fluid into said flocculation compartment to promote flocculation of the juice therein.

7. A sugar juice clarifier, comprising a tank; a plurality of superposed settling trays in said tank, spaced from one another and from the wall of the tank and having aprons depending from their edges to form a clarification compartment above each of said trays, an annular channel surrounding said clarification compartments, and a flocculation compartment below the lowermost one of said trays, said clarification and flocculation compartments being arranged to communicate, along the peripheries thereof, with said annular channel; an outlet for clarified juice in an upper portion of each of said clarification compartments; annular wall means concentric with and secured to the top of said tank to form a scum removal compartment; a raw juice inlet in said scum removal compartment; a vertical, rotatable tube, communicating with said scum removal compartment, extending through the centers of said trays, and discharging into a central portion of said flocculation compartment; a scum outlet in said scum removal compartment; scraper means secured to and rotatable with said tube, in a lower portion of each of said clarification compartments, to collect mud from said trays; means to rotate said tube; and means to remove collected mud from said tank.

8. A sugar clarifier according to claim 7 wherein said outlets for clarified juice communicate with central parts of said upper portions of said clarification compartments.

9. A sugar clarifier according to claim 7, wherein said trays are spaced from said tube to form an additional, annular channel, adjacent to and surrounding said tube, said channel being arranged to communicate with inner parts of said clarification and flocculation compartments.

10. A sugar clarifier according to claim 7, comprising an additional conduit connecting an inner part of each clarification compartment with the central portion of the flocculation compartment; and means to control the flow of material through said additional conduit.

11. A sugar clarifier according to claim 7 comprising a mud outlet at the bottom of said tank; an auxiliary tray above said mud outlet and below said flocculation chamber; scraper means secured to and rotatable with said tube over said auxiliary tray; and scraper means secured to and rotatable with said tube over the bottom of the tank, below said tray.

EARLE M. COPP.

REFERENCES CITED

The following references are of record in the file of this patent:

UNITED STATES PATENTS

| Number | Name | Date |
|---|---|---|
| 1,602,014 | Graham et al. | Oct. 5, 1926 |
| 1,754,870 | Wickes | Apr. 15, 1930 |
| 2,141,371 | Bach | Dec. 27, 1938 |
| 2,253,500 | Arango | Aug. 26, 1941 |
| 2,253,878 | Weber | Aug. 26, 1941 |
| 2,343,836 | Weber | Mar. 7, 1944 |